United States Patent [19]

Tellden

[11] Patent Number: 4,804,304
[45] Date of Patent: Feb. 14, 1989

[54] ROBOT WRIST

[75] Inventor: Leif Tellden, Västerås, Sweden

[73] Assignee: ASEA Aktiebolag, Västerås, Sweden

[21] Appl. No.: 60,309

[22] Filed: Jun. 10, 1987

[30] Foreign Application Priority Data

Jun. 12, 1986 [SE] Sweden ............................... 8602625

[51] Int. Cl.[4] ............................................... B66C 1/10
[52] U.S. Cl. ...................... 414/735; 901/26; 901/29
[58] Field of Search ................ 414/735; 901/26, 29

[56] References Cited

U.S. PATENT DOCUMENTS

| | | | |
|---|---|---|---|
| 3,739,923 | 6/1973 | Totsuka | 901/29 X |
| 4,492,510 | 1/1985 | Tanii et al. | 901/26 X |
| 4,548,097 | 10/1985 | Zimmer | 74/665 M |
| 4,608,884 | 9/1986 | Beyer | 901/29 X |
| 4,671,732 | 6/1987 | Gorman | 901/29 X |
| 4,683,772 | 8/1987 | Colimitra | 901/29 X |

FOREIGN PATENT DOCUMENTS

| | | | |
|---|---|---|---|
| 54763 | 9/1984 | European Pat. Off. . | |
| 3444478 | 6/1986 | Fed. Rep. of Germany | 901/29 |
| 3532265 | 3/1987 | Fed. Rep. of Germany | 901/29 |
| 216677 | 12/1984 | German Democratic Rep. | 901/26 |
| 8401536 | 4/1984 | PCT Int'l Appl. | 901/29 |
| 8605137 | 9/1986 | PCT Int'l Appl. | 901/29 |
| 598749 | 3/1978 | U.S.S.R. | 414/735 |

*Primary Examiner*—Robert J. Spar
*Assistant Examiner*—William M. Hienz
*Attorney, Agent, or Firm*—Watson, Cole, Grindle & Watson

[57] ABSTRACT

The wrist is built up of two wrist halves, between which the tilt with the turning disc is journalled. Each wrist half comprises an intermediate gearing with conical gear wheels and is built together with a drive motor. The two wrist halves are identical, and each half constitutes an individual trimmable drive unit for turning the tilt and the turning disc, respectively.

11 Claims, 3 Drawing Sheets

ROBOT WRIST

TECHNICAL FIELD

The present invention relates to industrial robots, and more particularly to robot wrists of the kind which include a wrist housing mounted on a robot arm; a wrist part, usually called the tilt, turnably journalled in the housing, the turning axis of the tilt being perpendicular to the longitudinal axis of the robot arm; and a tool attachment rotatably journalled in the tilt, for example, in the form of a turning disc.

BACKGROUND ART

A wrist of the kind mentioned above is known from European patent specification No. 0 054 763. The wrist disclosed in that specification includes, among other things, two intermediate gears having conical gear wheels for driving the tilt and the tool attachment. The driven gear wheels in these gears are each arranged on a respective part of a two-part intermediate shaft, in which one of the bearings of one of the shaft parts is supported by the other shaft part. In this embodiment, the axes of rotation of the two shaft parts must be in exact alignment with each other, which involves problems from the manufacturing point of view, thereby raising the price of the wrist.

DISCLOSURE OF THE INVENTION

The object of the invention is to achieve a wrist of the above-mentioned kind which enables rational manufacture and in which—with retained repetition accuracy of the robot—greater machining tolerances can be permitted than in comparable, prior art designs. This is achieved according to the invention by designing the wrist so as to be composed of two separate parts which, except for manufacturing tolerances, are identical in construction and which respectively provide the drive means for the tilt and the tool attachment journalled therein.

The design permits the manufacture of the wrist halves to be completed individually, whereby relatively great machining tolerances can be allowed. The installation of the motor and the first gear stage as well as the running in and the subsequent backlash adjustment of this gear stage can be carried out individually on each half before the wrist is assembled. This is a considerable advantage since it is usually time-consuming to after-adjust this type of gear, which in prior art designs may involve heavy costs in the form of loss of production in, for example, a welding line for cars.

In contrast to the above-mentioned prior art robot wrist, the centre line of the intermediate shaft in one of the wrist halves need not coincide with the centre line for the intermediate shaft in the other half, which is a considerable advantage from the manufacturing point of view.

BRIEF DESCRIPTION OF THE DRAWING

The invention will be described in greater detail below with reference to an embodiment shown in the accompanying drawing, wherein.

DESCRIPTION OF THE PREFERRED EMBODIMENT

Figure 1:
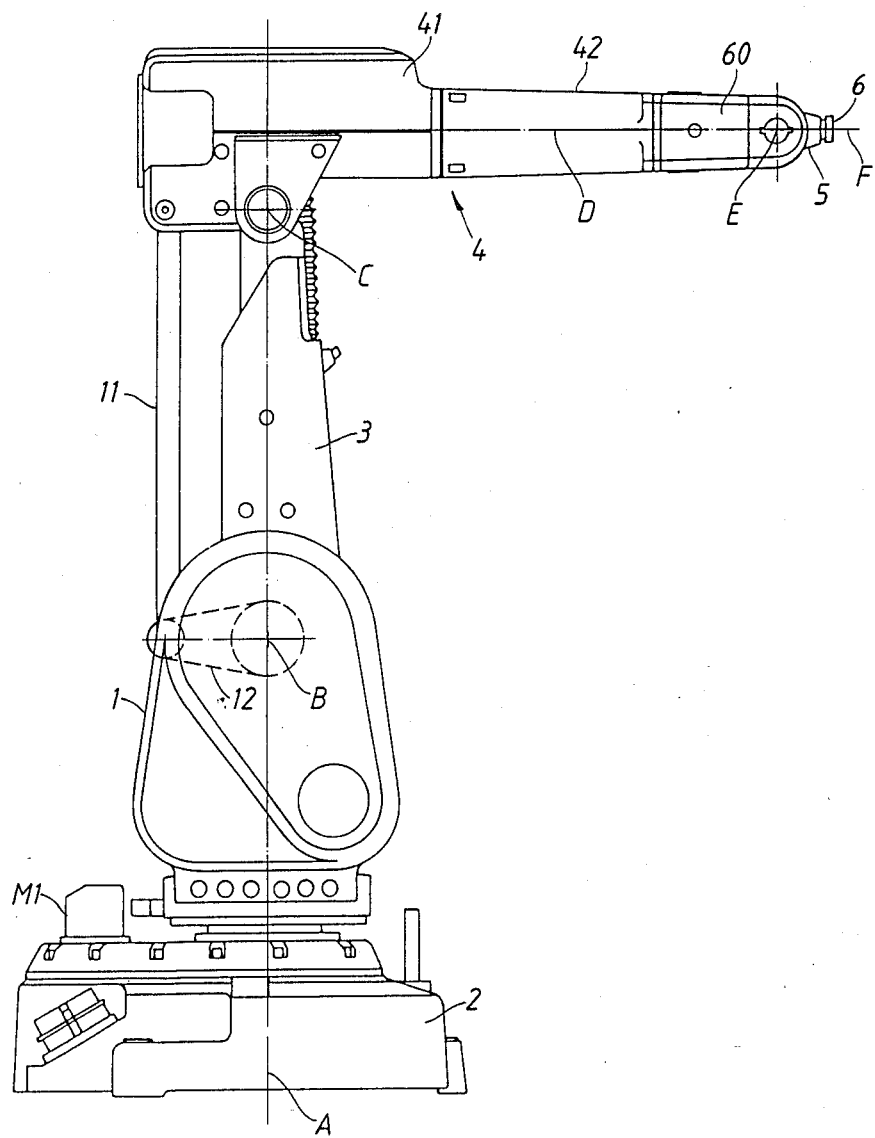
FIG. 1 is a side view of an industrial robot according to the invention.

The robot shown in FIG. 1 has a stand 1 which can be rotated, by means of a motor M1, relative to a base plate 2 about a vertical axis A. A first robot arm 3, the primary arm, is pivotably journalled in the stand 1 about an axis B. At the upper end of the arm 3 a second arm 4, the secondary arm, is pivotably journalled about an axis C. The pivoting of the arm 4 takes place over a parallel support member 11, the lower end of which is articulately connected to a motor-driven crank 12 and the upper end of which is articulately connected to the rear part of the arm 4. Motors with gear units for pivoting the arms 3 and 4 are built into the stand 1.

Figure 2:
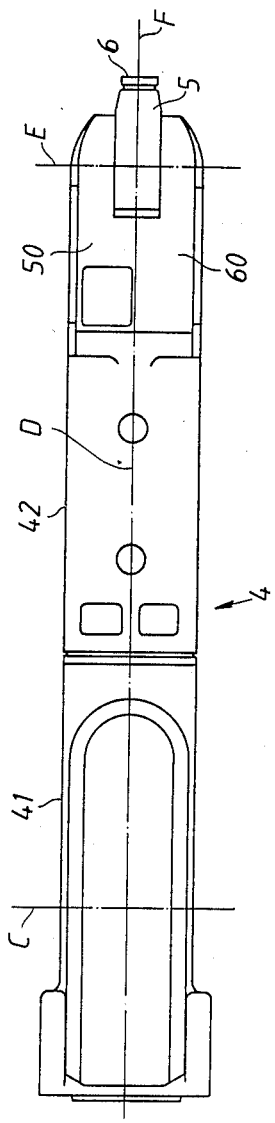
FIG. 2 is a top view of the secondary arm of the robot.

FIG. 2 shows a top view of the secondary arm 4 of the robot. It consists of a rear part 41, which is turnable about the axis C, and a tubular front part 42 which is journalled in the rear part 41 and is turnable about the longitudinal axis D of the arm 4. The outer end portion of the front arm part 42 consists of a wrist which is built up of two wrist parts 50, 60, between which a wrist part 5, the tilt, which is turnable about an axis E and is provided with a tool attachment in the form of a turning disc 6, is journalled. The turning disc 6 is turnable about the longitudinal axis F of the tilt 5.

Figure 3:
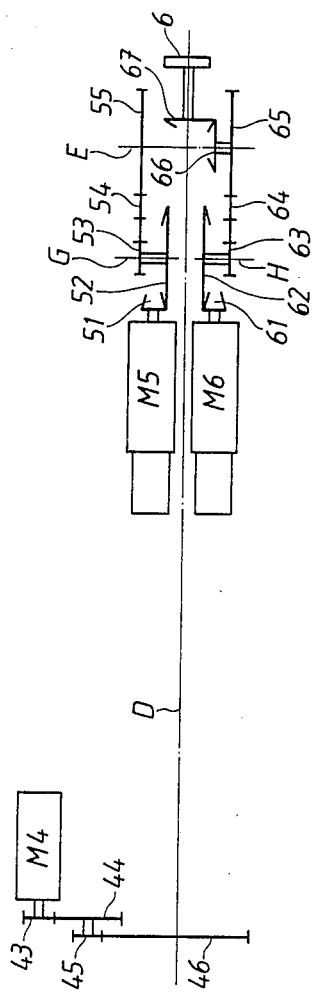
FIG. 3 is an explanatory sketch of the drive means for the different parts in the wrist.

FIG. 3 shows the arrangement for driving the front arm part 42, the tilt 5 and the turning disc 6. The front arm part 42 is driven by a motor M4 via a gear unit with four cylindrical gear wheels 43, 44, 45 and 46, the wheel 46 being fixedly connected to the arm part 42.

The tilt 5 is driven by a motor M5 via a bevel gear pinion 51, which is fixed on the motor shaft and which is in engagement with a bevel gear wheel 52 rotatably journalled in the wrist housing about an axis G positioned perpendicular to the axis of rotation D of the front arm part 42. The bevel gear wheel 52 is fixedly connected to a cylindrical gear pinion 53, which in its turn, via an intermediate wheel 54, drives a gear rim 55 which is fixedly connected to the tilt housing.

The drive means for the turning disc 6 (like the drive means for the tilt) comprises a motor M6 on whose shaft a bevel gear pinion 61 is located which is in engagement with a bevel gear wheel 62 journalled in the wrist housing and being rotatable about an axis H positioned perpendicular to the axis of rotation D of the front wrist part 42. The bevel gear wheel 62 is joined to a cylindrical gear pinion 63, which via an intermediate wheel 64 drives a cylindrical gear wheel 65 which is rotatably journalled about the pivot axis E of the tilt 5. The gear wheel 65 is joined to a bevel gear pinion 66 which is in engagement with a bevel gear wheel 67, which is fixedly connected to the turning disc 6.

Figure 4:
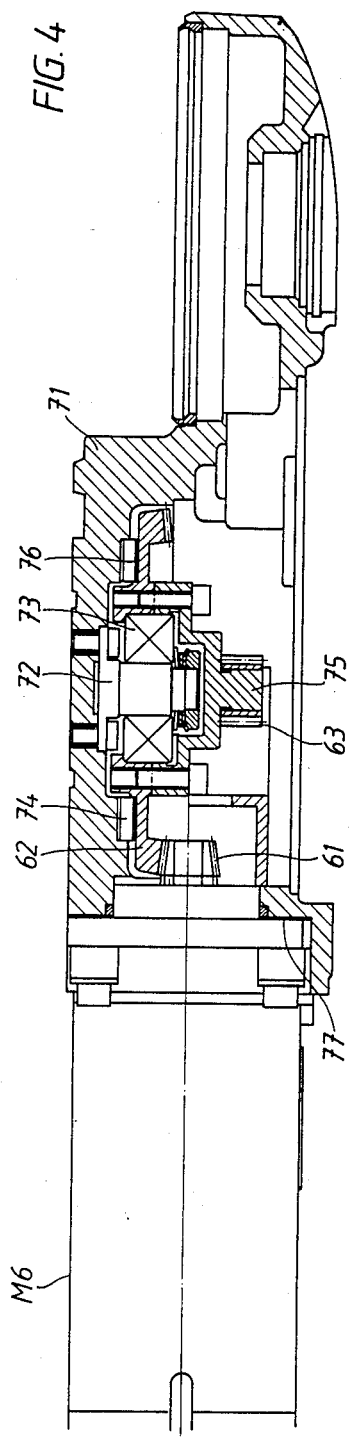
FIG. 4 is a longitudinal section through one wrist part.

FIG. 4 shows the construction of one of the two identical wrist halves. It comprises a wrist housing half 71 with a shaft pin 72 fixed therein, on which the bevel gear wheel 62 is rotatably journalled by means of, for example, a conical roller bearing 73 and a thrust bearing 74. A shaft pin 75 is screwed to the gear wheel 62, the cylindrical gear pinion 63 being fixed on the shaft pin 75. The shaft pins 72 and 75 are coaxial. The drive motor M6 is screwed to the wrist housing half 71, the gear pinion 61 being fixed on the shaft of the drive motor M6 and being in engagement with the gear wheel 62. The backlash in the angular gear 61, 62 is adjusted by means of so-called shims 76, 77 of brass located between the gear wheel 62 and the thrust bearing 74 and between the motor M6 and the wrist housing half 71.

Figure 5:
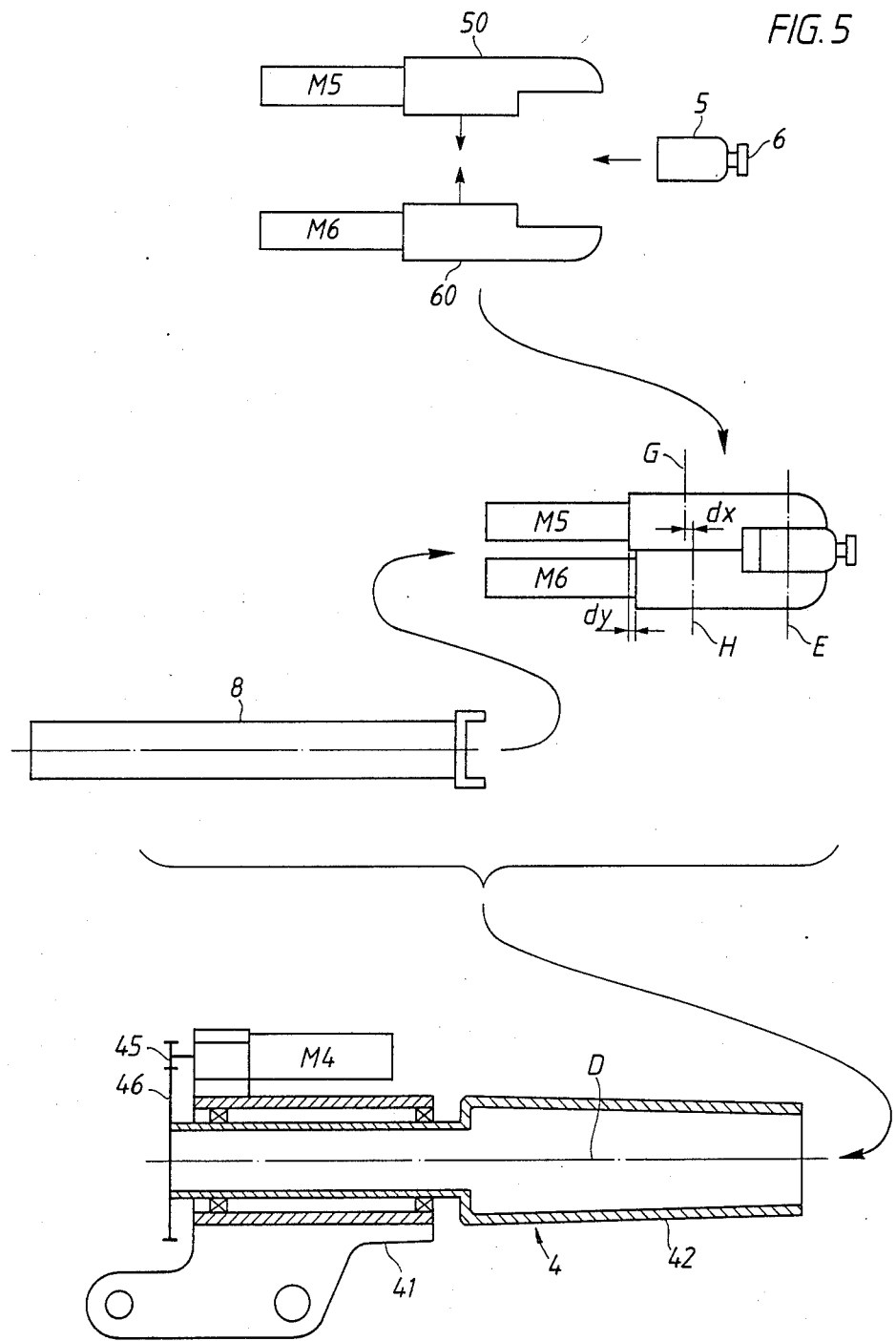
FIG. 5 is an explanatory sketch showing the various stages during the assembly of the secondary arm of the robot.

FIG. 5 shows roughly how the wrist is assembled and installed in the secondary arm 4 of the robot. Two wrist halves 50 and 60 (obtained from a storage) with drive motors M5, M6 mounted on them—the first gear stages 51, 52 and 61, 62, respectively, having already been run in and after-adjusted—are screwed together after the tilt 5 with the turning disc 6 has been placed between them. With the exception of manufacturing tolerances, the wrist halves are exactly identical and include, in addition to the parts shown in FIG. 4, also the intermediate wheels 54, 64. The tilt 5 is journalled in the wrist housing halves by means of conical roller bearings. When assembling the two halves, it is important that the axis of rotation E of the tilt 5 is positioned exactly perpendicular to the longitudinal axis (the axis of rotation D) of the wrist housing. On the other hand, the centre line G for the intermediate shaft in one of the wrist halves does not have to coincide with the centre line H for the intermediate shaft or the other half (illustrated by the distance indication dx in FIG. 5).

When the wrist has been assembled, it is connected to a cable assembly 8 consisting of control and power cables, for example, as shown in U.S. application Ser. No. 049,222, filed May 13, 1987. Thereafter, the wrist with the mounted cable assembly is installed in the hollow secondary arm 4 of the robot. If the contact surfaces of the two wrist housing halves with the end surface of the front arm part 42 because of manufacturing tolerances do not lie in the same plane, the difference (dy) is levelled out during installation by means of shims, thus preventing obliquity of the wrist in relation to the arm part 42.

The invention is not limited to the emobodiment shown. For example, the wrist may also be used in a five-axis robot, in which the motor M4 with the associated gear unit is missing and the front arm part 42 is not rotatable in the rear part 41.

I claim:

1. A robot wrist which is attachable to a free end of a robot arm so as to be aligned with a longitudinal axis D of said robot arm, said robot wrist comprising
a first wrist part comprising a first housing part, a first bevel gear wheel journalled in said first housing part, a first shaft pin attached to said first bevel gear wheel to rotate around an axis G which is perpendicular to said longitudinal axis D when said robot wrist part is attached to said robot arm, a first intermediate wheel which is in engagement with said first shaft pin, and a first motor attached to said first housing part for rotating said first bevel gear wheel,
a second wrist part comprising a second housing part, a second bevel gear wheel journalled in said second housing part, a second shaft pin attached to said second bevel gear wheel to rotate around an axis H which is perpendicular to said longitudinal axis D when said robot wrist is attached to said robot arm, a second intermediate wheel which is in engagement with said second shaft pin, and a second motor attached to said second housing part for rotating said second bevel gear wheel, said second wrist part being identical to said first wrist part except for manufacturing tolerances, and
a tilt mounted between said first and second wrist parts so as to be rotatable about an axis E which is perpendicular to said longitudinal axis D when said robot wrist is attached to said robot arm, said tilt including a tool attachment journalled therein, a first gear rim for engagement with said first intermediate wheel in said first wrist part for rotating said tilt about said axis E and a second gear rim for engagement with said second intermediate wheel in said second wrist part for rotating said tool attachment.

2. A robot wrist according to claim 1, wherein said first motor includes a first bevel gear pinion in engagement with said first bevel gear wheel, and wherein said second motor includes a second bevel gear pinion in engagement with said second bevel gear wheel.

3. A robot wrist according to claim 1, including a third shaft pin fixedly mounted in said first housing part and a first roller bearing positioned around said third shaft pin, said first bevel gear wheel being rotatably mounted on said first roller bearing so that said first shaft pin is aligned with said third shaft pin.

4. A robot wrist according to claim 3, including a fourth shaft pin fixedly mounted in said second housing part and a second roller bearing positioned around said fourth shaft pin, said second bevel gear wheel being rotatably mounted on said second roller bearing so that said second shaft pin is aligned with said fourth shaft pin.

5. A robot wrist according to claim 1, including a first thrust bearing between said first housing part and said first bevel gear wheel and a second thrust bearing positioned between said second housing part and said second bevel gear wheel.

6. A robot wrist according to claim 5, including first shim means between said first thrust bearing and said first bevel gear wheel and second shim means between said second thrust bearing and second bevel gear wheel.

7. The combination of a robot arm having a free end and a longitudinal axis D and a robot wrist attached to said free end of said robot arm so as to be aligned with said longitudinal axis D, said robot wrist comprising
a first wrist part comprising a first housing part, a first bevel gear wheel journalled in said first housing part, a first shaft pin attached to said first bevel gear wheel to rotate around an axis G which is perpendicular to said longitudinal axis D when said robot wrist part is attached to said robot arm, a first intermediate wheel which is in engagement with said first shaft pin, and a first motor attached to said first housing part for rotating said first bevel gear wheel,
a second wrist part comprising a second housing part, a second bevel gear wheel journalled in said second housing part, a second shaft pin attached to said second bevel gear wheel to rotate around an axis H which is perpendicular to said longitudinal axis D when said robot wrist is attached to said robot arm, a second intermediate wheel which is in engagement with said second shaft pin, and a second motor attached to said second housing part for rotating said second bevel gear wheel, said second wrist part being identical to said first wrist part except for manufacturing tolerances, and
a tilt mounted between said first and second wrist parts so as to be rotatable about an axis E which is perpendicular to said longitudinal axis D when said robot wrist is attached to said robot arm, said tilt including a tool attachment journalled therein, a first gear rim for engagement with said first intermediate wheel in said first wrist part for rotating said tilt about said axis E and a second gear rim for engagement with said second intermediate wheel in said second wrist part for rotating said tool attachment.

8. The combination according to claim 7, wherein said first motor includes a first bevel gear pinion in engagement with said first bevel gear wheel, and wherein said second motor includes a second bevel gear pinion in engagement with said second bevel gear wheel.

9. The combination according to claim 7, including a third shaft pin fixedly mounted in said first housing part and a first roller bearing positioned around said third shaft pin, said first bevel gear wheel being rotatably mounted on said first roller bearing so that said first shaft pin is aligned with said third shaft pin.

10. The combination according to claim 9, including a fourth shaft pin fixedly mounted in said second housing part and a second roller bearing positioned around said fourth shaft pin, said second bevel gear wheel being rotatably mounted on said second roller bearing so that said second shaft pin is aligned with said fourth shaft pin.

11. The combination according to claim 7, wherein said free end of said robot arm provides a hollow chamber therein, wherein a portion of said robot wrist is positioned within said hollow chamber, and wherein said robot arm includes means to rotate said robot wrist about said longitudinal axis D.

* * * * *